United States Patent
Suzuki et al.

(10) Patent No.: US 12,503,162 B2
(45) Date of Patent: Dec. 23, 2025

(54) YAW RATE CONTROL APPARATUS, YAW RATE CONTROL METHOD, AND STORAGE MEDIUM

(71) Applicant: ISUZU MOTORS LIMITED, Yokohama (JP)

(72) Inventors: Motoya Suzuki, Fujisawa (JP); Shuuichi Yahagi, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 75 days.

(21) Appl. No.: 18/530,633

(22) Filed: Dec. 6, 2023

(65) Prior Publication Data

US 2024/0182113 A1    Jun. 6, 2024

(30) Foreign Application Priority Data

Dec. 6, 2022  (JP) ................. 2022-195083

(51) Int. Cl.
*B62D 15/02* (2006.01)
*B60W 10/20* (2006.01)

(52) U.S. Cl.
CPC .......... *B62D 15/025* (2013.01); *B60W 10/20* (2013.01); *B60W 2520/14* (2013.01); *B60W 2540/18* (2013.01)

(58) Field of Classification Search
CPC .... B62D 15/025; B62D 6/003; B62D 15/021; B60W 10/20; B60W 2520/14; B60W 2540/18
USPC ........................................................ 701/41
See application file for complete search history.

(56) References Cited

U.S. PATENT DOCUMENTS

| | | | |
|---|---|---|---|
| 2005/0275284 A1 | 12/2005 | Katayama | |
| 2017/0053533 A1* | 2/2017 | Kuroda | .................. G08G 1/167 |
| 2021/0016825 A1* | 1/2021 | Miura | ..................... B62D 6/003 |
| 2022/0009546 A1 | 1/2022 | Mori | |

FOREIGN PATENT DOCUMENTS

| | | |
|---|---|---|
| JP | 2005-335588 A | 12/2005 |
| JP | 2018-047754 A | 3/2018 |
| JP | 2021-031018 A | 3/2021 |
| JP | 2021-142889 A | 9/2021 |
| JP | 2022-023388 A | 2/2022 |
| WO | 2020-115973 A1 | 6/2020 |

* cited by examiner

*Primary Examiner* — Yi-Kai Wang
(74) *Attorney, Agent, or Firm* — Shih IP Law Group, PLLC (57) ABSTRACT

A yaw rate control apparatus includes an integral gain calculation part that calculates an integral gain corresponding to each vehicle speed of the vehicle acquired by an acquisition part at predetermined time intervals, a first steering angle calculation part that calculates a first steering angle that depends on a difference between a yaw rate of the vehicle and the target yaw rate, a second steering angle calculation part that calculates a second steering angle at the predetermined time intervals on the basis of i) a difference between the yaw rate of the vehicle and the target yaw rate and ii) the integral gain, and an output part that outputs a steering angle of the vehicle, acquired by adding together the first steering angle and the second steering angle, to a steering part of the vehicle.

5 Claims, 7 Drawing Sheets

YAW RATE CONTROL APPARATUS, YAW RATE CONTROL METHOD, AND STORAGE MEDIUM

CROSS-REFERENCE TO RELATED APPLICATIONS

The present application claims priority to Japanese Patent Application number 2022-195083, filed on Dec. 6, 2022, contents of which are incorporated herein by reference in its entirety.

BACKGROUND OF THE INVENTION

The present disclosure relates to a yaw rate control apparatus, a yaw rate control method, and a storage medium.

When a vehicle turns at a predetermined vehicle speed, a conventional vehicle steering apparatus determines a steering torque of the vehicle depending on a difference between an estimated yaw rate at the predetermined vehicle speed and a yaw rate generated by turning the vehicle (for example, see PCT International Publication No. WO2020/115973).

A conventional vehicle steering apparatus has a problem that if a vehicle turns at a vehicle speed different from a predetermined vehicle speed, a difference between an estimated yaw rate and a yaw rate of the vehicle is greater than in a case where the vehicle turns at the predetermined vehicle speed, resulting in the vehicle being unable to travel on a correct route.

BRIEF SUMMARY OF THE INVENTION

The present disclosure focuses on this point, and an object thereof is to perform yaw rate control suitable for a vehicle speed of a vehicle.

Means for Solving the Problems

A yaw rate control apparatus of a first aspect of the present disclosure includes an acquisition part that acquires a yaw rate of a vehicle when the vehicle turns, a target yaw rate for traveling on a route set for the vehicle, and a vehicle speed of the vehicle, an integral gain calculation part that calculates an integral gain corresponding to each vehicle speed of the vehicle acquired by the acquisition part at predetermined time intervals, a first steering angle calculation part that calculates a first steering angle that depends on a difference between a yaw rate of the vehicle and the target yaw rate, a second steering angle calculation part that calculates a second steering angle at the predetermined time intervals on the basis of i) a difference between the yaw rate of the vehicle and the target yaw rate and ii) the integral gain, and an output part that outputs a steering angle of the vehicle, acquired by adding together the first steering angle and the second steering angle, to a steering part of the vehicle.

A yaw rate control method of a second aspect of the present disclosure executed by a processor, the method includes the steps of acquiring a yaw rate of a vehicle when the vehicle turns, a target yaw rate for traveling on a route set for the vehicle, and a vehicle speed of the vehicle, calculating an integral gain corresponding to each vehicle speed of the vehicle acquired at predetermined time intervals, calculating a first steering angle that depends on a difference between a yaw rate of the vehicle and the target yaw rate, calculating a second steering angle at the predetermined time intervals on the basis of i) a difference between a yaw rate of the vehicle and the target yaw rate and ii) the integral gain, and outputting a steering angle of the vehicle, acquired by adding together the first steering angle and the second steering angle, to the steering part of the vehicle.

A storage medium storing a program of a third aspect of the present disclosure for causing a processor to execute the steps of acquiring a yaw rate of a vehicle when the vehicle turns, a target yaw rate for traveling on a route set for the vehicle, and a vehicle speed of the vehicle, calculating an integral gain corresponding to each vehicle speed of the vehicle acquired at predetermined time intervals, calculating a first steering angle that depends on a difference between a yaw rate of the vehicle and the target yaw rate, calculating a second steering angle at the predetermined time intervals on the basis of i) a difference between a yaw rate of the vehicle and the target yaw rate and ii) the integral gain, and outputting a steering angle of the vehicle, acquired by adding together the first steering angle and the second steering angle, to the steering part of the vehicle.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

Overview of Vehicle S

Figure 1:
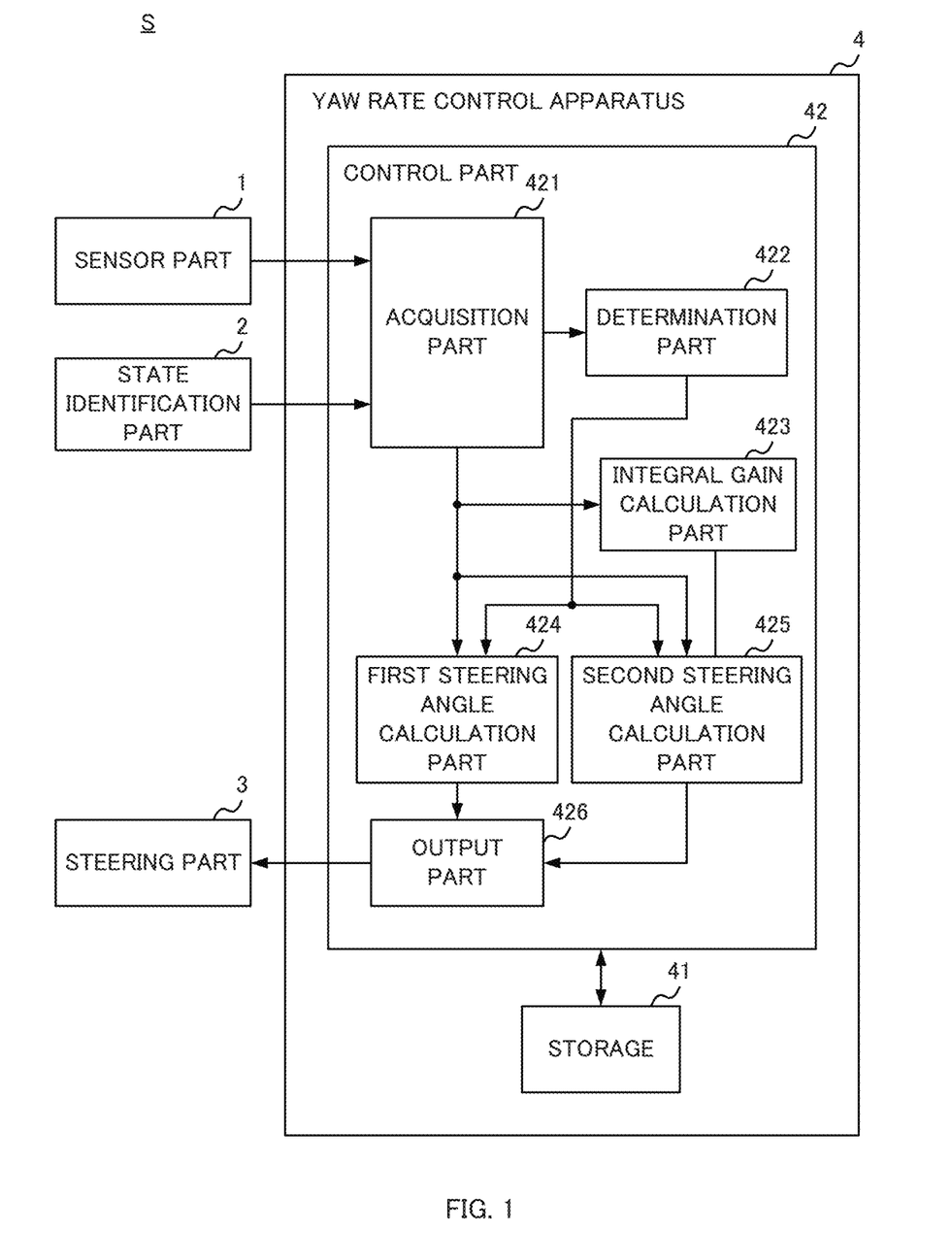
FIG. 1 illustrates an overview of a vehicle S according to the present embodiment.

FIG. 1 illustrates an overview of a vehicle S according to the present embodiment. The vehicle S shown in FIG. 1 includes a sensor part 1, a state identification part 2, a steering part 3, and a yaw rate control apparatus 4. The vehicle S has a function of calculating a steering angle for traveling along a route set for the vehicle S (hereinafter referred to as a "set route") and automatically steering the vehicle S when turning.

The sensor part 1 includes a speed sensor, a steering angle sensor, and a yaw rate sensor, and detects a vehicle speed, a steering angle, and a yaw rate of the vehicle S during travel.

The state identification part 2 includes a receiving device that receives a radio wave indicating a position of the vehicle S from an external positioning system such as Global Navigation Satellite System (GNSS). The state identification part 2 identifies a traveling direction of the vehicle S by identifying the positions of the vehicle S at a plurality of times on the basis of the radio waves received by the receiving device, and identifies a target yaw rate on the basis of i) an angle between a direction indicated by the set route and said traveling direction and ii) a difference between a position included in the set route and the position of the vehicle S.

The steering part 3 has a function of automatically steering the vehicle S in a state where a driver of the vehicle S does not steer the vehicle S. The steering part 3 rotates a steering shaft by means of a steering motor (not shown in figures) on the basis of, for example, a steering angle inputted by the yaw rate control apparatus 4 to turn the traveling vehicle S to the right or to the left.

The yaw rate control apparatus 4 calculates the steering angle of the vehicle S when turning on the basis of the vehicle speed and the yaw rate of the vehicle S detected by the sensor part 1 and the target yaw rate of the vehicle S identified by the state identification part 2. The yaw rate control apparatus 4 controls the yaw rate of the vehicle S when turning by causing the steering part 3 to automatically steer the vehicle S when turning on the basis of the steering angle calculated at predetermined time intervals. The yaw rate control apparatus 4 may include a housing including electronic components, or may be a printed substrate on which the electronic components are mounted.

A feedback controller such as a Proportional Integral Differential (PID) controller based on a plant model, in which a dynamic model of the vehicle S is system-identified, could be designed as a controller for controlling the yaw rate of the vehicle S when turning. The PID controller based on the plant model can correctly control the yaw rate when the vehicle S travels at the vehicle speed at which the system identification was made, but cannot correctly control the yaw rate if the vehicle S travels at a vehicle speed different from the vehicle speed at which the system identification was made.

Therefore, the yaw rate control apparatus 4 acquires the vehicle speed of the vehicle S detected by the sensor part 1 and calculates the steering angle corresponding to that vehicle speed, at the predetermined time intervals during turning of the vehicle S. Thus, yaw rate control suitable for the vehicle speed of the vehicle S when turning can be performed.

A configuration and operation of the yaw rate control apparatus 4 will be described in detail below.

Configuration of Yaw Rate Control Apparatus 4

The yaw rate control apparatus 4 includes a storage 41 and a control part 42. The control part 42 includes an acquisition part 421, a determination part 422, an integral gain calculation part 423, a first steering angle calculation part 424, a second steering angle calculation part 425, and an output part 426.

The storage 41 includes a storage medium such as a Read Only Memory (ROM), a Random Access Memory (RAM), a Hard Disk Drive (HDD), or a Solid State Drive (SSD). The storage 41 stores a program executed by the control part 42. The storage 41 stores various kinds of information for outputting the steering angle to the steering part 3.

The control part 42 is a processor such as a Central Processing Unit (CPU) or an Electronic Control Unit (ECU), for example. By executing the program stored in the storage 41, the control part 42 functions as the acquisition part 421, the determination part 422, the integral gain calculation part 423, the first steering angle calculation part 424, the second steering angle calculation part 425, and the output part 426.

It should be noted that the control part 42 may be formed by a single processor, or may be formed by a plurality of processors or a combination of one or more processors and an electronic circuit.

The configuration of each part implemented by the control part 42 is described below.

The acquisition part 421 acquires the yaw rate of the vehicle S when turning, the target yaw rate for traveling on the route set for the vehicle S, and the vehicle speed of the vehicle S. The acquisition part 421 acquires the yaw rate and the vehicle speed from the sensor part 1 and acquires the target yaw rate from the state identification part 2 at the predetermined time intervals, for example. The predetermined time interval is a time interval determined by experiment or simulation. The acquisition part 421 acquires the target yaw rate determined by i) an angle between the traveling direction of the vehicle S based on the radio waves indicating the positions of the vehicle S at a plurality of times and the direction indicated by the set route and ii) a difference between the position of the vehicle S based on said radio waves and the position of the vehicle S included in the set route. The acquisition part 421 stores the acquired yaw rate, target yaw rate, and vehicle speed in the storage 41.

The acquisition part 421 acquires the steering angle and the yaw rate when the vehicle S travels at a constant speed. As an example, the constant speed is 20 km/h. For example, the acquisition part 421 acquires the steering angle and the yaw rate from the sensor part 1 at the predetermined time intervals during a time at which the vehicle S is traveling at the constant speed, and stores them in the storage 41.

The determination part 422 determines a control parameter for calculating a first steering angle and a second steering angle. The first steering angle is a steering angle calculated by the first steering angle calculation part 424 using a Proportional (P) controller, and the second steering angle is a steering angle calculated by the second steering angle calculation part 425 using an Integral (I) controller. The control parameter is a coefficient used by at least one of the first steering angle calculation part 424 and the integral gain calculation part 423.

Figure 2:
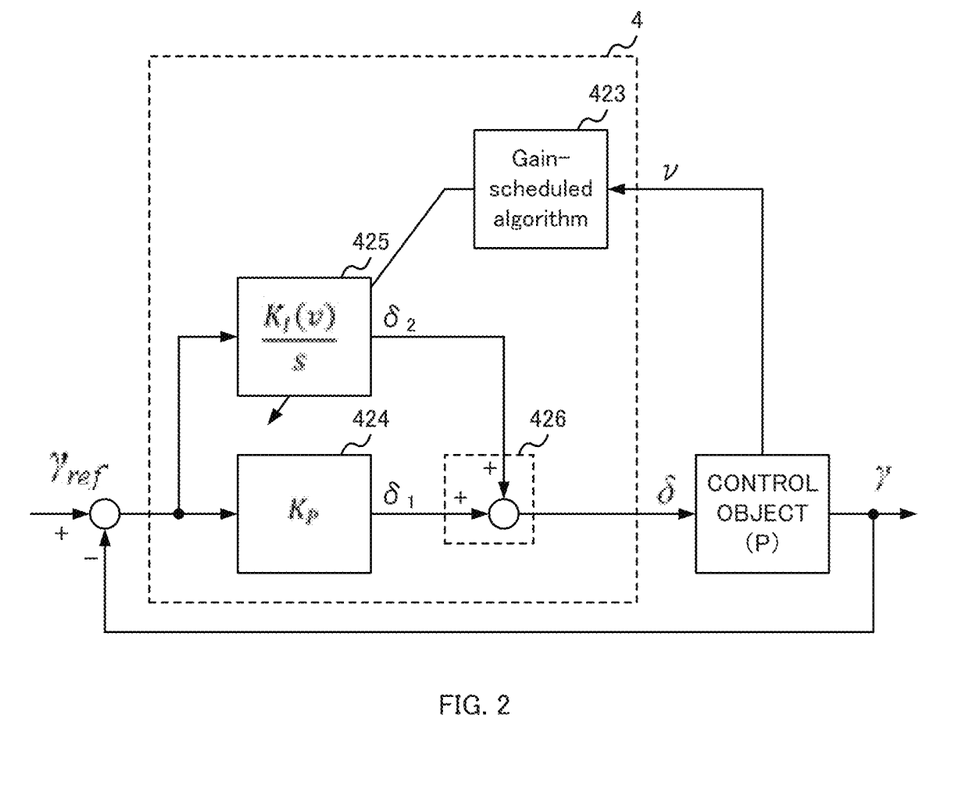
FIG. 2 is a control block diagram illustrating an operation of determining a steering angle of the vehicle S.

FIG. 2 is a control block diagram illustrating an operation of determining the steering angle of the vehicle S. A control object (P) shown in FIG. 2 is the vehicle S including the steering part 3. FIG. 2 shows a first steering angle $\delta_1$, a second steering angle $\delta_2$, a steering angle $\delta$ outputted to the steering part 3 by the yaw rate control apparatus 4, a yaw rate $\gamma$, a target yaw rate $\gamma_{ref}$, and a vehicle speed v of the vehicle S. Gain $K_P$ is a proportional gain corresponding to a control parameter $K_{P0}$, gain $K_I(v)$ is an integral gain corresponding to a control parameter $K_{I0}$ and the vehicle speed v, and an operator s is a Laplace operator.

A method for determining the control parameter $K_{P0}$ and the control parameter $K_{I0}$ performed by the determination part 422 is described in detail below.

Figure 3A:
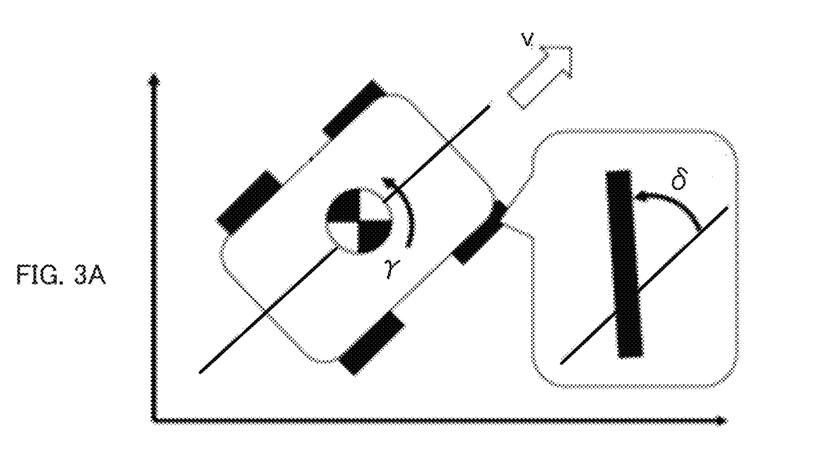
FIG. 3A is a model of the vehicle S.
Figure 3B:
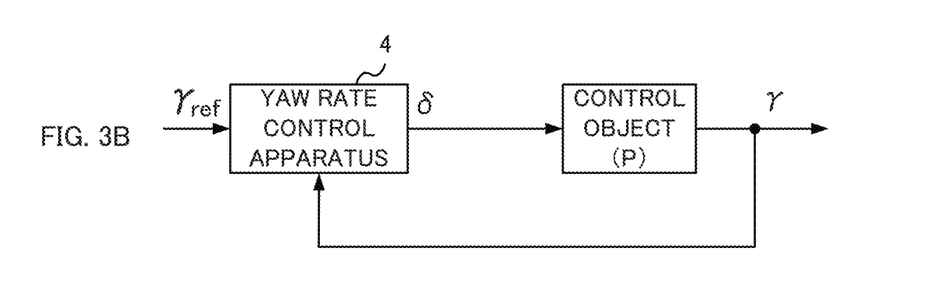
FIG. 3B is a block diagram of an automatic steering system.

First, an automatic steering system for automatically steering front wheels of the vehicle S is described. FIGS. 3A and 3B illustrate the automatic steering system. FIG. 3A is a model of the vehicle S, and FIG. 3B is a block diagram of the automatic steering system. FIG. 3A shows the steering angle $\delta$ of the front wheels of the vehicle S, the yaw rate $\gamma$ of the vehicle S, and the vehicle speed v of the vehicle S.

The automatic steering system shown in FIG. 3B can control the left and right movements of the front wheels by having the yaw rate control apparatus 4 input the steering angle $\delta$ to the control object (P) (that is, the steering part 3). The yaw rate control apparatus 4 shown in FIG. 3B calculates the steering angle δ on the basis of the yaw rate γ and the target yaw rate $\gamma_{ref}$ acquired by the acquisition part 421. Further, a normative model $T_d$ corresponding to the yaw rate control apparatus 4 and the control target (P) can be given as in Equation (1).

$$\gamma = T_d \gamma_{ref} \tag{1}$$

The determination part 422 determines the control parameter using i) a plurality of steering angles δ and a plurality of yaw rates γ (hereinafter sometimes referred to as "a set of experimental data") acquired at the predetermined time intervals when the vehicle S turns at a constant vehicle speed v and ii) the normative model $T_d$ shown in Equation (1). As an example, the determination part 422 determines the control parameter by Virtual Internal Model Tuning (VIMT) using the set of experimental data and the normative model $T_d$.

Figure 4:
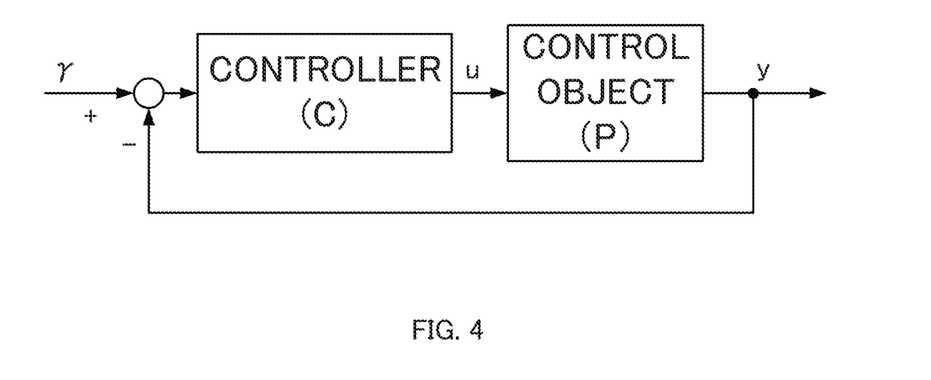
FIG. 4 is a block diagram of single-degree-of-freedom system control.

Here, an overview of the operation of determining the control parameter by VIMT is described. FIG. 4 is a block diagram of single-degree-of-freedom system control. The control object (P) is the steering part 3, and a controller (C) is the yaw rate control apparatus 4 including the feedback controller. In FIG. 4, it is assumed that an initial controller $C_{ini}$ is given as the controller (C) before determining the control parameter. When a normative model of a closed loop shown in FIG. 4 is $T_d$, a response target value $y_{des}$ of the closed loop can be expressed as in Equation (2).

$$y_{des} = T_d r \tag{2}$$

It is then assumed that Equation (3) is satisfied if disturbance and noise at the time of acquiring an output $y_0$ of the closed loop (hereinafter, sometimes referred to as "initial output $y_0$") due to an input of a target value γ to the closed loop is small. An initial output $u_0$ is an output of the controller C due to the input of the target value γ into the closed loop.

$$y_0 = P u_0 \tag{3}$$

If Equation (3) is satisfied, Equations (4) and (5) are satisfied for a response y(ρ) of the closed loop by having the determination part 422 determine the control parameter and update the control parameter included in the initial controller $C_{ini}$ (that is, an update of the controller (C)). A variable ρ is an adjustment parameter of the controller.

$$y(\rho) = T_c(\rho) r \tag{4}$$

$$T_c(\rho) = \frac{PC(\rho)}{1 + PC(\rho)} \tag{5}$$

Further, the initial output $y_0$ can be expressed as in Equation (6) on the basis of Equation (3), and the target value γ can be expressed as in Equation (7) on the basis of Equation (6).

$$y_0 = P u_0$$
$$= PC_{ini}(r - y_0) \tag{6}$$

$$r = y_0 + \frac{1}{PC_{ini}} y_0 \tag{7}$$

Since the control object (P) can be expressed as in Equation (8) on the basis of Equation (5), the output y(ρ) of the closed loop using a feedback controller C(ρ) can be expressed as in Equation (9) using Equation (8), Equation (4), and Equation (7).

$$P = \frac{T_c(\rho)}{(1 - T_c(\rho))C(\rho)} \tag{8}$$

$$y(\rho) = \left( T_c(\rho) + \frac{(1 - T_c(\rho))C(\rho)}{C_{ini}} \right) y_0 \tag{9}$$

Here, in order to calculate the response y(ρ) in Equation (9), a response $Y_e(\rho)$ of the closed loop acquired by replacing $T_c(\rho)$ in Equation (9) with the normative model $T_d$ is given as in Equation (10).

$$y_e(\rho) = \left( T_d + \frac{(1 - T_d)C(\rho)}{C_{ini}} \right) y_0 \tag{10}$$

In order to determine the control parameter by VIMT, the variable ρ is identified such that a difference between Equation (10) and Equation (2) is minimized to make a difference between the response of the closed loop and the target value response small. Specifically, the variable ρ is identified such that an output value of the evaluation function $J_I(\rho)$ shown in Equation (11) is minimized.

$$J_I(\rho) = \| T_d r - y_e(\rho) \| \tag{11}$$

$$\|w\|: \sqrt{\frac{1}{N} \sum_{i=0}^{N} w^2(Ti)}$$

$\|w\|$ is a norm of $\|w\| := \sqrt{\frac{1}{N} \sum_{i=0}^{N} w^2(Ti)}$, a variable N is the number of data of time signal w, and a variable T is a sampling time.

In FIG. 4, if the disturbance and noise is small, the initial output $y_0$ can be expressed as in Equation (12). Further, Equation (13) is satisfied for an ideal controller $C_{des}$ that realizes the response of the normative model $T_d$.

$$y_0 = \frac{PC_{ini}}{1 + PC_{ini}} r \tag{12}$$

$$T_d = \frac{PC_{des}}{1 + PC_{des}} \tag{13}$$

Then, the evaluation function $J_I(\rho)$ of VIMT can be expressed as in Equation (14) by using Equations (10) to (13).

$$J_I(\rho) = \left\| \left\{ 1 - \frac{C(\rho)}{C_{des}} \right\} \frac{T_d}{1 + PC_{ini}} r \right\| \tag{14}$$

Minimization of the output value of the evaluation function $J_I(\rho)$ shown in Equation (14) corresponds to an evaluation of a relative error between the ideal controller $C_{des}$ and the controller C after update (that is, after the determination of the control parameter) under the weighting of an initial sensitivity function and the normative model $T_d$. Therefore, by minimizing the output value of the evaluation function $J_I(\rho)$, the relative error between the ideal controller $C_{des}$ and the controller C after update can be made minimized in a passband of a filter consisting of the normative model $T_d$ and the initial sensitivity function.

Specifically, if the minimum value of $J_f(\rho)$ is 0, the ideal controller $C_{des}$ can be identified on condition that $T_d/(1+PC_{ini})\gamma$ has Persistently Exciting (PE) properties. In this case, $T_c(\rho)=T_d$, and so $y(\rho)=y_e(\rho)=y_{des}$. If the minimum value of $J_f(\rho)$ is not 0, the controller C can be identified if the passband of the weight function consisting of the normative model Ta and the initial sensitivity function is sufficiently wide. That is, the determination part 422 can determine the control parameter by minimizing the output value of the evaluation function $J_f(\rho)$.

Figure 5:
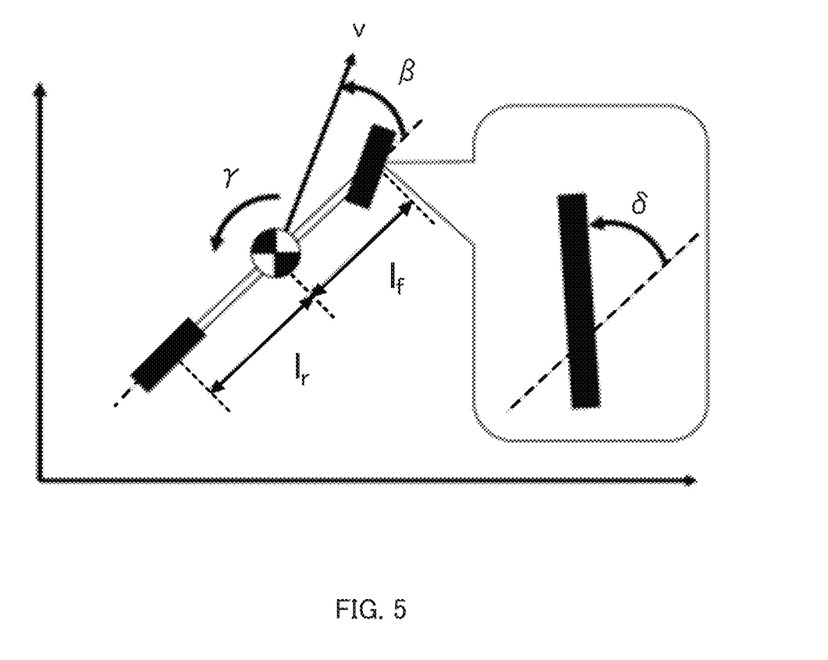
FIG. 5 is an equivalent model of the vehicle S.

Next, the operation of identifying the controller C for controlling the yaw rate of the vehicle S by VIMT (that is, the operation of determining the control parameter of the controller C by VIMT) is described using an equivalent model of the vehicle S. FIG. 5 is the equivalent model of the vehicle S. In the present embodiment, an equivalent model of a two-wheeled vehicle is used for simplicity of explanation. A motion model of the vehicle S shown in FIG. 5 can be expressed by Equations (15) to (22) using a front-wheel cornering coefficient $K_f$, a rear-wheel cornering coefficient $K_r$, a distance $l_f$ from a center of gravity to the front wheel, a distance lr from the center of gravity to rear wheel, a weight m of the vehicle S, the vehicle speed v of the vehicle S, a sideslip angle $\beta$ of the vehicle S, and an inertia moment I.

$$\frac{d\beta}{dt} = \frac{a_{11}}{v}\beta + \left(-1 + \frac{a_{12}}{v^2}\right)\gamma + \frac{a_{13}}{v}\delta \quad (15)$$

$$\frac{d\gamma}{dt} = a_{21}\beta + \frac{a_{22}}{v}\gamma + a_{23}\delta \quad (16)$$

$$a_{11} = -\frac{K_f + K_r}{m} \quad (17)$$

$$a_{12} = \frac{-l_f K_f + l_r K_r}{m} \quad (18)$$

$$a_{13} = \frac{K_f}{m} \quad (19)$$

$$a_{21} = \frac{-l_f K_f + l_r K_r}{I} \quad (20)$$

$$a_{22} = -\frac{l_f^2 K_f + l_r^2 K_r}{I} \quad (21)$$

$$a_{23} = \frac{l_f K_f}{I} \quad (22)$$

In traveling of the vehicle S, the greater the sideslip angle $\beta$, the higher the possibility of saturation of a tire force, and therefore, the difference between the position of the vehicle S and the position included in the route increases. Therefore, in the traveling of the vehicle S with the automatic steering function, the target yaw rate $\gamma_{ref}$ and the vehicle speed v are set such that the sideslip angle $\beta$ is sufficiently small. This allows the sideslip angle $\beta \approx 0$ to be set, so a motion equation from the steering angle $\delta$ to the yaw rate $\gamma$ can be expressed as in Equation (23) by substituting the sideslip angle $\beta=0$ into Equation (16).

$$\frac{d\gamma}{dt} = \frac{a_{22}}{v}\gamma + a_{23}\delta \quad (23)$$

Then, a transfer function G (v) from the steering angle $\delta$ to the yaw rate $\gamma$ can be expressed as in Equations (24) to (26) by Laplace transforming Equation (23). Further, the normative model $T_d$ is set as in Equation (27). A constant $T_s$ shown in Equation (27) is a time constant.

$$G(v) = \frac{\sigma_k v}{\sigma_T v s + 1} \quad (24)$$

$$\sigma_k = -\frac{a_{23}}{a_{21}} \quad (25)$$

$$\sigma_T = -\frac{1}{a_{22}} \quad (26)$$

$$T_d = \frac{1}{T_s s + 1} \quad (27)$$

Figure 6:
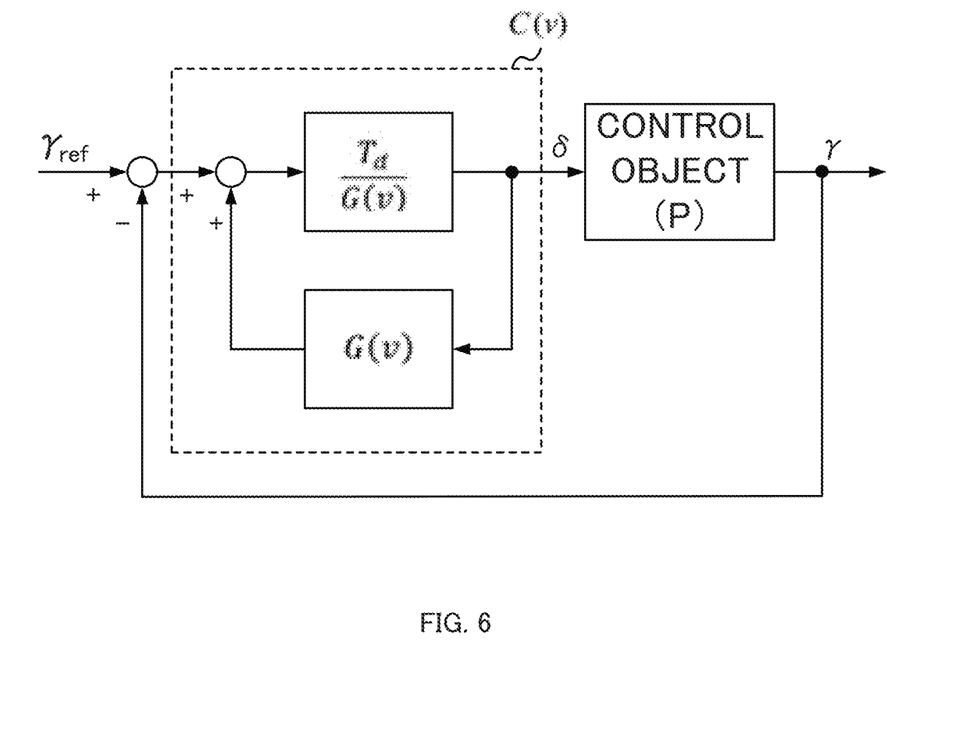
FIG. 6 is a block diagram of internal model control.

It should be noted that it is known that an operation of internal model control, which is a type of feedback control, can be equivalently transformed to an operation of PID control (hereafter, equivalently transforming something is sometimes referred to as "equivalent transform"). Thereby it is possible to derive the PID controller, acquired by equivalently transforming an internal model controller that uses the transfer function G(v) and the normative model $T_d$. FIG. 6 is a block diagram of the internal model control. By equivalently transforming the block diagram shown in FIG. 6, the feedback controller C for making a closed-loop transfer function coincide with the normative model $T_d$ can be derived as in Equation (28).

$$C = \frac{T_d}{G(v)(1 - T_d)} \quad (28)$$

By substituting Equations (24) and (27) into Equation (28), the feedback controller C can be derived as in Equation (29).

$$C = \frac{T_d}{G(v)(1 - T_d)} \quad (29)$$

$$= \frac{\sigma_T v s + 1}{\sigma_k v} \frac{T_d}{(1 - T_d)}$$

$$= \frac{\sigma_T v s + 1}{\sigma_k v} \frac{\frac{1}{T_s s + 1}}{\left(1 - \frac{1}{T_s s + 1}\right)}$$

$$= \frac{\sigma_T v s + 1}{\sigma_k v} \frac{\frac{1}{T_s s + 1}}{\left(1 - \frac{1}{T_s s + 1}\right)}$$

$$= \left(\frac{\sigma_T}{\sigma_k}s + \frac{1}{\sigma_k v}\right)\frac{1}{T_s s}$$

$$= \left(\frac{\sigma_T}{\sigma_k T_s} + \frac{1}{T_s \sigma_k v}\frac{1}{s}\right)$$

It can be seen that the feedback controller C is equivalent to a Proportional Integral (PI) controller from Equation (29), and therefore the PI controller can be derived as in Equation (30) to Equation (32).

$$C(v) = K_P + \frac{K_I(v)}{s} \quad (30)$$

$$K_P = \frac{\sigma_T}{\sigma_k T_s} \quad (31)$$

$$K_I(v) = \frac{1}{T_s \sigma_k v} \quad (32)$$

In the PI controller, acquired by equivalently transforming the block diagram shown in FIG. 6, the yaw rate of the vehicle S including the steering part 3, which is the control target (P), can be controlled by identifying the gain $K_P$ and the gain $K_I(v)$ shown in Equations (31) and (32). Further, by updating the gain $K_I(v)$ depending on the vehicle speed v acquired by the acquisition part 421 at the predetermined time intervals, the yaw rate of the vehicle S can be controlled even if the vehicle speed v changes. However, since Equations (31) and (32) include a coefficient $\sigma_T$ and a coefficient $\sigma_K$ based on motion characteristics of the vehicle S, the gain $K_P$ and the gain $K_I(v)$ cannot be identified.

The yaw rate control apparatus 4 therefore identifies the gain $K_P$ and the gain $K_I(v)$ by applying VIMT and updates the gain $K_I(v)$ on the basis of the vehicle speed v acquired from the sensor part 1 at the predetermined time intervals, thereby controlling the yaw rate of the vehicle S when turning. In order to apply VIMT, the vehicle S travels at a constant vehicle speed $v_0$ in a state where the initial controller $C_{ini}$ is given to the yaw rate control apparatus 4 as the controller (C). The yaw rate control apparatus 4 acquires the steering angle $\delta_0$ and the yaw rate $\gamma_0$ at the vehicle speed $v_0$. The PI controller is then defined as in Equations (33) and (34). The control parameter $K_{P0}$ is the gain $K_P$ if the evaluation function J of VIMT is at a minimum, and the control parameter $K_{I0}$ is $K_I(v_0)$ if the evaluation function J of VIMT is at a minimum.

$$C_v(\rho) = K_{P0} + \frac{K_{I0}}{s} \quad (33)$$

$$\rho = [K_{P0} \ K_{I0}] \quad (34)$$

The determination part 422 determines the gain $K_P$ and the gain $K_I$ (the control parameter $K_{P0}$ and the control parameter $K_{I0}$) by calculating the yaw rate response $\gamma_e(\rho)$ as in Equation (35) on the basis of Equation (10) and minimizing the output of the evaluation function J of VIMT using Equation (35) (the evaluation function $J(\rho)$ shown in Equation (36)).

$$\gamma_e(\rho) = \left(T_d + \frac{(1-T_d)C_v(\rho)}{C_{ini}}\right)\gamma_0 \quad (35)$$

$$J(\rho) = \|T_d \gamma_{ref} - \gamma_e(\rho)\| \quad (36)$$

As shown in Equation (36), the determination part 422 calculates a normative model output value $T_d \gamma_{ref}$ by inputting the target yaw rate $Y_{ref}$ into the normative model $T_d$ corresponding to the yaw rate control apparatus 4 and the vehicle S. The determination part 422 calculates the response $\gamma_e(\rho)$ of the closed loop including i) the vehicle S and ii) the controller (C), which is the feedback controller with the vehicle S as the control object. The determination part 422 determines the control parameter (that is, the control parameter $K_{P0}$ and the control parameter $K_{I0}$) such that the output value of the evaluation function $J(\rho)$, which indicates an absolute value of a difference between the output value $T_d \gamma_{ref}$ and the response $\gamma_e(\rho)$ of said closed loop, is minimized.

The determination part 422 determines, as an initial value of the control parameter, the control parameter determined by using the steering angle $\delta_0$ and the yaw rate $\gamma_0$ such that the output value of the evaluation function $J(\rho)$ is minimized, for example. The steering angle $\delta_0$ and the yaw rate $\gamma_0$ are the steering angle and the yaw rate when the vehicle S travels at the constant vehicle speed $v_0$ in a state where the initial controller $C_{ini}$ is given as the controller (C). The determination part 422 determines the control parameter if the determination part 422 has not determined the initial value of the control parameter and also the vehicle S turns at the constant vehicle speed $v_0$.

If it can be determined that the closed-loop transfer function $G(v_0)C_v/(1+G(v_0)C_v)$ at the vehicle speed $v_0$ coincides with the normative model $T_d$, Equations (37) and (38) are satisfied.

$$K_P \cong K_{P0} \quad (37)$$

$$K_I(v_0) = \frac{1}{T_s \sigma_k v_0} \cong K_{I0} \quad (38)$$

$K_P$ shown in Equation (37) is a proportional gain used by the first steering angle calculation part 424 shown in FIGS. 2, and $K_I$ shown in Equation (38) is the integral gain used by the second steering angle calculation part 425 shown in FIG. 2. In FIG. 2, the determination part 422 determines, using VIMT, the control parameter $K_{P0}$ and the control parameter $K_{I0}$ such that the output value of the evaluation function $J(\rho)$ is minimized. That is, the determination part 422 determines the control parameter, including the control parameter $K_{P0}$ and the control parameter $K_{I0}$, such that the output value of the evaluation function $J(\rho)$ is minimized. Thus, the yaw rate control apparatus 4 can realize the PI controller comprising the first steering angle calculation part 424 and the second steering angle calculation part 425.

Further, the integral gain $K_I(v)$ can be expressed as in Equation (39), from Equation (37).

$$K_I(v) = K_{I0} \frac{v_0}{v} \quad (39)$$

$K_I(v)$ shown in Equation (39) is the output value of the integral gain calculation part 423 shown in FIG. 2, and "Gain-scheduled algorithm" shown in FIG. 2 performs the process shown in Equation (39). That is, after the determination part 422 determines the control parameter $K_{I0}$ using VIMT, the integral gain calculation part 423 calculates the integral gain $K_I(v)$ depending on the vehicle speed v of the vehicle S at the predetermined time intervals. As a result, the second steering angle calculation part 425 can calculate the second steering angle $\delta_2$ based on the integral gain that depends on the vehicle speed v, at the predetermined time intervals.

In the PID controller based on the plant model, since the motion characteristics of the vehicle S vary with the vehicle speed, it is necessary to use a plant model that can adapt with each of the vehicle speeds at which the vehicle S can travel when the steering part 3 automatically steers the vehicle S. However, the system identification for generating such a plant model requires a lot of traveling time. On the other hand, the yaw rate control apparatus 4, using VIMT described above, does not require the system identification, and can realize the PI controller that outputs the steering angle $\delta$ corresponding to the vehicle speed v only by acquiring the steering angle $\delta_0$ and the yaw rate $\gamma_0$ once when the vehicle S is traveling at the constant vehicle speed $v_0$. As a result, the traveling time and a design time required for the system identification can be reduced.

The above describes a method for determining the control parameter by the determination part 422.

Referring back to FIG. 1, the integral gain calculation part 423 calculates the integral gain $K_I(v)$ corresponding to each vehicle speed v of the vehicle S acquired by the acquisition part 421 at the predetermined time intervals. The integral gain calculation part 423 calculates the integral gain $K_I(v)$ at the predetermined time intervals by inputting, for example, the vehicle speed v acquired by the acquisition part 421 at the predetermined time intervals to Equation (39). By having the integral gain calculation part 423 operate in this manner, the integral gain depending on a change in the vehicle speed v of the vehicle S when turning can be calculated. As a result, the second steering angle calculation part 425 can calculate the second steering angle $\delta_2$ corresponding to the vehicle speed v at which the vehicle S can travel at the predetermined time intervals The first steering angle calculation part 424 calculates the first steering angle $\delta_1$ depending on the difference between the yaw rate γ of the vehicle S and the target yaw rate $\gamma_{ref}$. The first steering angle calculation part 424 calculates the first steering angle $\delta_1$ by inputting, for example, the difference between the yaw rate γ and the target yaw rate $\gamma_{ref}$ to the P controller shown in Equation (37).

The second steering angle calculation part 425 calculates the second steering angle $\delta_2$ at the predetermined time intervals on the basis of i) the difference between the yaw rate γ of the vehicle S and the target yaw rate $\gamma_{ref}$ and ii) the integral gain $K_I(v)$. The second steering angle calculation part 425 calculates the second steering angle $\delta_2$ at the predetermined time intervals by inputting, for example, the integral gain $K_I(v)$ acquired from the integral gain calculation part 423 at the predetermined time intervals to the I controller shown in Equation (38). By having the second steering angle calculation part 425 operate in this manner, it is possible to calculate the second steering angle $\delta_2$ corresponding to the vehicle speed v detected at the predetermined time intervals.

The output part 426 outputs the steering angle δ of the vehicle S, acquired by adding together the first steering angle $\delta_1$ and the second steering angle $\delta_2$, to the steering part 3 of the vehicle S. The output part 426 calculates the steering angle δ by acquiring the first steering angle $\delta_1$ and the second steering angle $\delta_2$ at the predetermined time intervals, for example, and outputs the steering angle δ to the steering part 3.

Processing Sequence in Yaw Rate Control Apparatus 4

Figure 7:
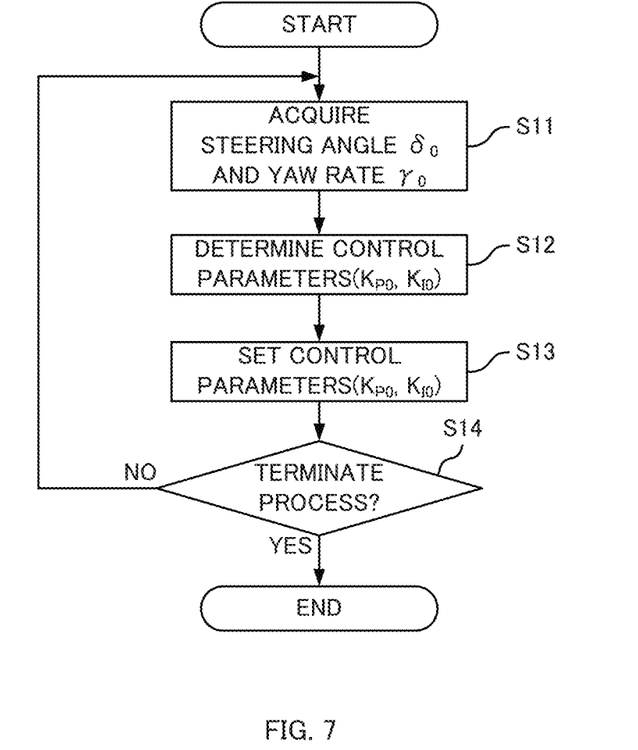
FIG. 7 shows an example of a processing sequence in a yaw rate control apparatus 4.

FIG. 7 shows an example of a processing sequence in the yaw rate control apparatus 4. The processing sequence shown in FIG. 7 shows an operation of setting the control parameter determined by the determination part 422.

The acquisition part 421 acquires the steering angle $\delta_0$ and the yaw rate $\gamma_0$ detected by the sensor part 1 when the vehicle S travels at the constant vehicle speed $v_0$ (S11). The determination part 422 determines the control parameter $K_{P0}$ and the control parameter $K_{I0}$ such that the output value of the evaluation function J(ρ), to which the steering angle $\delta_0$ and the yaw rate $\gamma_0$ acquired by the acquisition part 421 are inputted, is minimized (S12). Among the control parameters determined, the determination part 422 sets the control parameter $K_{P0}$ to the first steering angle calculation part 424 and the control parameter $K_{I0}$ to the integral gain calculation part 423 (S13).

If no operation to terminate the process is performed (NO in S14), the yaw rate control apparatus 4 repeats the operation from step S11 to step S13. If an operation to terminate the process is performed (YES in S14), the yaw rate control apparatus 4 terminates the process.

Effects of Yaw Rate Control Apparatus 4

As described above, the yaw rate control apparatus 4 includes i) the integral gain calculation part 423 that calculates the integral gain $K_I(v)$ corresponding to each vehicle speed v of the vehicle S acquired at the predetermined time intervals, ii) the first steering angle calculation part 424 that calculates the first steering angle $\delta_1$ that depends on the difference between the yaw rate γ of the vehicle S and the target yaw rate $\gamma_{ref}$, iii) the second steering angle calculation part 425 that calculates the second steering angle $\delta_2$ at the predetermined time intervals on the basis of i) the difference between the yaw rate γ of the vehicle S and the target yaw rate $\gamma_{ref}$ and ii) the integral gain $K_I(v)$, and iv) the output part 426 that outputs the steering angle δ of the vehicle S, acquired by adding together the first steering angle $\delta_1$ and the second steering angle $\delta_2$, to the steering part 3 of the vehicle S.

By having the yaw rate control apparatus 4 configured in this manner, the steering angle corresponding to the vehicle speed v of the vehicle S can be outputted to the steering part 3 even if the vehicle speed v of the vehicle S changes during turning, and therefore the yaw rate control suitable for the turning motion of the vehicle S can be performed. As a result, the vehicle S can achieve turning movement that takes into account the vehicle speed v using the automatic steering.

Further, the yaw rate control apparatus 4 includes the determination part 422 that determines the control parameter $K_{P0}$ and the control parameter $K_{I0}$ for minimizing the output of the evaluation function J(ρ) using VIMT, on the basis of the steering angle $\delta_0$ and the yaw rate $\gamma_0$ when the vehicle S travels at the constant speed $v_0$. By having the yaw rate control apparatus 4 configured in this manner, the PI controller for controlling the yaw rate of the vehicle S can be designed without performing the system identification, thus reducing the design time.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

The invention claimed is:

1. A yaw rate control apparatus comprising:
an acquisition part that acquires a yaw rate of a vehicle when the vehicle turns, a target yaw rate for traveling on a route set for the vehicle, and a vehicle speed of the vehicle;
a determination part that determines a control parameter for calculating a first steering angle and a second steering angle,
wherein an output value of an evaluation function is minimized, the output value of the evaluation function indicating an absolute value of a difference between i) a normative model output value outputted by a normative model corresponding to the yaw rate control apparatus and the vehicle by inputting the target yaw rate to the normative model and ii) a response of a closed loop including the vehicle and a feedback controller with the vehicle as a control object;

an integral gain calculation part that calculates an integral gain corresponding to each vehicle speed of the vehicle acquired by the acquisition part at predetermined time intervals, based on the control parameter;

a first steering angle calculation part that calculates the first steering angle that depends on a difference between a yaw rate of the vehicle and the target yaw rate;

a second steering angle calculation part that calculates the second steering angle at the predetermined time intervals on the basis of i) a difference between the yaw rate of the vehicle and the target yaw rate and ii) the integral gain; and an output part that outputs a steering angle of the vehicle, acquired by adding together the first steering angle and the second steering angle, to a steering part of the vehicle, wherein the acquisition part acquires a plurality of steering angles and a plurality of yaw rates at the predetermined time intervals when the vehicle turns at a constant vehicle speed, and the determination part determines, as an initial value of the control parameter, the control parameter determined by using the steering angle and the yaw rate wherein the output value of the evaluation function is minimized.

2. The yaw rate control apparatus according to claim 1, wherein the acquisition part acquires the target yaw rate determined by i) an angle between a traveling direction of the vehicle based on a radio wave indicating a position of the vehicle at a plurality of times and a direction indicated by the route that is set and ii) a difference between a position of the vehicle based on the radio wave and a position of the vehicle included in the route that is set.

3. The yaw rate control apparatus according to claim 1, wherein the determination part determines the control parameter if the determination part has not determined the initial value of the control parameter and also the vehicle turns at a constant speed.

4. A yaw rate control method executed by a processor, the method comprising:

acquiring a yaw rate of a vehicle when the vehicle turns, a target yaw rate for traveling on a route set for the vehicle, and a vehicle speed of the vehicle;

determining a control parameter for calculating a first steering angle and a second steering angle, wherein an output value of an evaluation function is minimized, the output value of the evaluation function indicating an absolute value of a difference between i) a normative model output value outputted by a normative model corresponding to the yaw rate control apparatus and the vehicle by inputting the target yaw rate to the normative model and ii) a response of a closed loop including the vehicle and a feedback controller with the vehicle as a control object;

calculating an integral gain corresponding to each vehicle speed of the vehicle acquired at predetermined time intervals, based on the control parameter;

calculating the first steering angle that depends on a difference between a yaw rate of the vehicle and the target yaw rate;

calculating the second steering angle at the predetermined time intervals on the basis of i) a difference between a yaw rate of the vehicle and the target yaw rate and ii) the integral gain; and outputting a steering angle of the vehicle, acquired by adding together the first steering angle and the second steering angle, to the steering part of the vehicle, wherein the acquiring the yaw rate includes acquiring a plurality of steering angles and a plurality of yaw rates at the predetermined time intervals when the vehicle turns at a constant vehicle speed, and the determining the control parameter includes determining, as an initial value of the control parameter, the control parameter determined by using the steering angle and the yaw rate wherein the output value of the evaluation function is minimized.

5. A storage medium storing a program for causing a processor to perform operations comprising:

acquiring a yaw rate of a vehicle when the vehicle turns, a target yaw rate for traveling on a route set for the vehicle, and a vehicle speed of the vehicle;

determining a control parameter for calculating a first steering angle and a second steering angle, wherein an output value of an evaluation function is minimized, the output value of the evaluation function indicating an absolute value of a difference between i) a normative model output value outputted by a normative model corresponding to the yaw rate control apparatus and the vehicle by inputting the target yaw rate to the normative model and ii) a response of a closed loop including the vehicle and a feedback controller with the vehicle as a control object;

calculating an integral gain corresponding to each vehicle speed of the vehicle acquired at predetermined time intervals, based on the control parameter;

calculating the first steering angle that depends on a difference between a yaw rate of the vehicle and the target yaw rate;

calculating the second steering angle at the predetermined time intervals on the basis of i) a difference between a yaw rate of the vehicle and the target yaw rate and ii) the integral gain; and outputting a steering angle of the vehicle, acquired by adding together the first steering angle and the second steering angle, to the steering part of the vehicle, wherein the acquiring the yaw rate includes acquiring a plurality of steering angles and a plurality of yaw rates at the predetermined time intervals when the vehicle turns at a constant vehicle speed, and the determining the control parameter includes determining, as an initial value of the control parameter, the control parameter determined by using the steering angle and the yaw rate wherein the output value of the evaluation function is minimized.

* * * * *